United States Patent
Fayolle

(10) Patent No.: US 11,536,171 B2
(45) Date of Patent: Dec. 27, 2022

(54) FILTER AND REMOVABLE CARTRIDGE INCLUDING A BYPASS VALVE

(71) Applicant: SOGEFI FILTRATION, Guyancourt (FR)

(72) Inventor: Laurent Fayolle, Nanterre (FR)

(73) Assignee: SOGEFI FILTRATION, Guyancourt (FR)

( * ) Notice: Subject to any disclaimer, the term of this patent is extended or adjusted under 35 U.S.C. 154(b) by 123 days.

(21) Appl. No.: 16/492,324

(22) PCT Filed: Mar. 6, 2018

(86) PCT No.: PCT/FR2018/050508
§ 371 (c)(1),
(2) Date: Sep. 9, 2019

(87) PCT Pub. No.: WO2018/162835
PCT Pub. Date: Sep. 13, 2018

(65) Prior Publication Data
US 2021/0131319 A1    May 6, 2021

(30) Foreign Application Priority Data

Mar. 9, 2017  (FR) ..................... 17 51921

(51) Int. Cl.
*F01M 11/03*  (2006.01)
*B01D 29/15*  (2006.01)
(Continued)

(52) U.S. Cl.
CPC ............. *F01M 11/03* (2013.01); *B01D 29/15* (2013.01); *B01D 35/147* (2013.01);
(Continued)

(58) Field of Classification Search
CPC .............. B01D 35/147; B01D 35/1475; B01D 2201/162; B01D 2201/4015; F01M 2001/1092
(Continued)

(56) References Cited

U.S. PATENT DOCUMENTS 5,922,196 A    7/1999  Baumann
6,117,312 A *  9/2000  Mees ................... B01D 35/147
                                            137/543.13
(Continued)

FOREIGN PATENT DOCUMENTS

| EP | 0800418 B1 | 2/2003 |
| FR | 2845929 A1 | 4/2004 |
| WO | 2015/092523 A1 | 6/2015 |

OTHER PUBLICATIONS

International Search Report, dated Jun. 7, 2018, from corresponding PCT application No. PCT/FR2018/050508.

*Primary Examiner* — Benjamin M Kurtz
(74) *Attorney, Agent, or Firm* — Nixon & Vanderhye

(57) ABSTRACT

The filter for the purification of a liquid of a combustion engine, particularly lubricating oil, includes a housing that has, in a bottom part, an inlet for raw liquid and an outlet for purified liquid, and an unscrewable lid. A cartridge, defined by a filtering insert and a preassembled bypass valve, is received in the housing. The insert has a flange for fixing the valve, covering an end of the filtering medium. The bypass valve can be separated from the cover such that the cartridge can be removed. The valve has a removable connection element that axially engages with a complementary securing component formed on the flange, in a locking configuration obtained by a pivoting action.

16 Claims, 3 Drawing Sheets

(51) Int. Cl.
*B01D 35/147* (2006.01)
*B01D 35/30* (2006.01)
*F01M 1/10* (2006.01)

(52) U.S. Cl.
CPC ............. *B01D 35/306* (2013.01); *F01M 1/10* (2013.01); *B01D 2201/162* (2013.01); *B01D 2201/305* (2013.01); *B01D 2201/347* (2013.01); *B01D 2201/4015* (2013.01); *B01D 2201/4092* (2013.01); *F01M 2001/1092* (2013.01)

(58) Field of Classification Search
USPC .......................................... 210/130, 429–431
See application file for complete search history.

(56) References Cited

U.S. PATENT DOCUMENTS

| | | | | |
|---|---|---|---|---|
| 6,251,273 | B1* | 6/2001 | Jawurek | B01D 29/96 210/232 |
| 7,871,515 | B2* | 1/2011 | Brandt | B01D 29/96 210/485 |
| 7,927,392 | B2* | 4/2011 | Clements | B01D 46/2414 55/378 |
| 2016/0375382 | A1* | 12/2016 | Girondi | B01D 35/147 210/232 |
| 2018/0065067 | A1* | 3/2018 | Ardes | B01D 29/15 |

* cited by examiner

FILTER AND REMOVABLE CARTRIDGE INCLUDING A BYPASS VALVE

BACKGROUND OF THE INVENTION

Field of the Invention

The present invention relates to the purification of liquids and in particular of the oil used in the internal combustion engines of motor vehicles.

The invention relates more particularly to a filter for purifying a liquid for an internal combustion engine, in particular lubricating oil, comprising:

a filter housing having an inlet for unprocessed liquid and an outlet for purified liquid, the housing defining an interior volume and comprising a cover that can be detached from the rest of the housing, for example by unscrewing;

a filter insert, which extends longitudinally between a distal first end of the outlet and a proximal second end of the outlet, adapted to be removably received within the interior volume by engaging in a bottom portion of the housing and comprising:

- a filter medium of annular shape which extends around a central axis (defining a longitudinal axis of the filter insert);
- a flange, located towards the first end, for covering one axial end of the filter medium;
- a bypass valve secured to the filter insert and interposed, within the interior volume towards the first end, between a region upstream of the filtration that is in communication with the inlet and a region downstream of the filtration that is in communication with the outlet.

DESCRIPTION OF THE RELATED ART

A filter of this type is described in document EP 0800418. This type of filter also generally presents a drainage duct (commonly called a drainage channel) which is preferably off-center or which surrounds the outlet region for the filtered liquid.

In the filter of document EP 0800418, the bypass valve comprises a closure member, a spring, and a closure member seat. A support tube of the filter insert makes it possible to mount the valve, while the closure member seat is integrated into a flange of the filter insert, which makes the bypass valve non-removable from the filter insert. An advantage of this design is that it is possible to reduce the required space between the upper flange of the filter insert and the cover.

A disadvantage of this type of filter is the complexity of its assembly. According to another option, as described in document FR 2845929 A1, a bypass valve is provided that is integrated into a clamping device for holding the filter cartridge and urging it axially against sealing surfaces, by means of a spring interposed between the cover and the bypass valve. The sealing of the bypass valve against the upper flange is obtained by an axial annular contact. This type of axial annular contact is not considered satisfactory (with a higher risk of leakage if the cover has not been screwed on all the way).

Other solutions propose mounting the bypass valve integral with the cover. However, this integration is usually not optimal in the height required and can take significant effort to properly attach the filter insert under the cover in order to obtain both a fastening with the cover and a sealed attachment with the bypass valve.

Document WO 2015/092523 A1 describes a method of attachment which requires a structure with specific reliefs at the periphery of the bypass valve and the use of a projecting free edge having a corrugated shape. This free edge is to be inserted between an inner projection of the flange provided with a seal and flexible locking tabs (elastically deformable tabs denoted "311" in FIGS. 1-2 of that document). The use of flexible tabs on the upper flange of the cartridge is a source of fragility (as these tabs must bend easily so that the attachment force is not too great) and the bypass valve is obviously not extractable from the cover.

Furthermore, the existing solutions do not allow for flexibility in the mode of integration of the bypass valve, which prevents for example reusing the same model of bypass valve, of the pre-assembled type, for a wide variety of filters.

SUMMARY OF THE INVENTION

There is therefore a need for an alternative solution for assembling a filter insert in a corresponding housing and which allows obtaining the bypass function, with little difficulty in manipulations for the user.

For this purpose, embodiments of the invention provide a filter of the above type, wherein the bypass valve is detachable from the cover so that the assembly formed by the filter insert and the bypass valve defines a removable cartridge, the bypass valve being a preassembled unit provided with at least one removable connection member which:

in a locking configuration, is axially engaged with complementary securing means formed on the first end of the filter insert, and allows subsequent disassembly of the bypass valve from the filter insert (the bypass valve thus being detachable from the filter insert), as the securing with locking the bypass valve to the first end is carried out by pivoting the bypass valve and the filter insert relative to one another about the central axis.

Thus, the invention provides an integration of the bypass valve which allows using the same model of valve with filter inserts of varying structure, it being sufficient that their first end, close to the cover, has for example a central adapter interface for fitting to the valve.

Typically, the complementary securing means are formed on the flange to which the bypass valve is directly attached.

The invention also relates to a cartridge combining the functions of liquid filtration to remove impurities (particularly solids) in a liquid lubricant, and of bypassing in case of overpressure, adapted for cooperation in a filter according to the invention, wherein this removable cartridge is defined by the filter insert which is disposable and by the bypass valve which is reusable.

Typically, such a cartridge, removably mounted in the filter housing, is provided with a plugging member which is formed in the filter insert and projects axially opposite from the bypass valve in order to plug a drainage channel of the filter.

In various embodiments of the cartridge of the invention, one or more of the following arrangements may possibly be further employed:

the filter insert has a mounting flange for attachment to the bypass valve in a bayonet-type connection, the bypass valve having:

an insertable portion that is inserted through a central hole of the mounting flange, a complementary outer portion of the insertable portion and which includes removable connection member, in the inserted state, the insertable portion is arranged such that the valve closure member is engaged on a seating region in an interior space bordered by an inner face of the filter medium, the bayonet-type connection is formed between the removable connection member and the complementary securing means, the removable connection member extends substantially in a plane perpendicular to the longitudinal axis of the filter insert, the removable connection member is adapted for engaging with coupling members of the flange, at a distance from a radial portion of the mounting flange which allows covering an axial end of the filter medium.

the filter insert further comprises a positioning flange supporting two annular seals arranged one on either side of a downwardly projecting annular protrusion formed in the positioning flange, the annular protrusion and the two seals defining the plugging member.

the two annular seals are each received in a respective circumferential groove of the annular protrusion.

BRIEF DESCRIPTION OF DRAWINGS

Other features and advantages of the invention will be apparent from the following description of several of its embodiments, given as non-limiting examples, with reference to the accompanying drawings in which.

DESCRIPTION OF THE PREFERRED EMBODIMENTS

Figure 1:
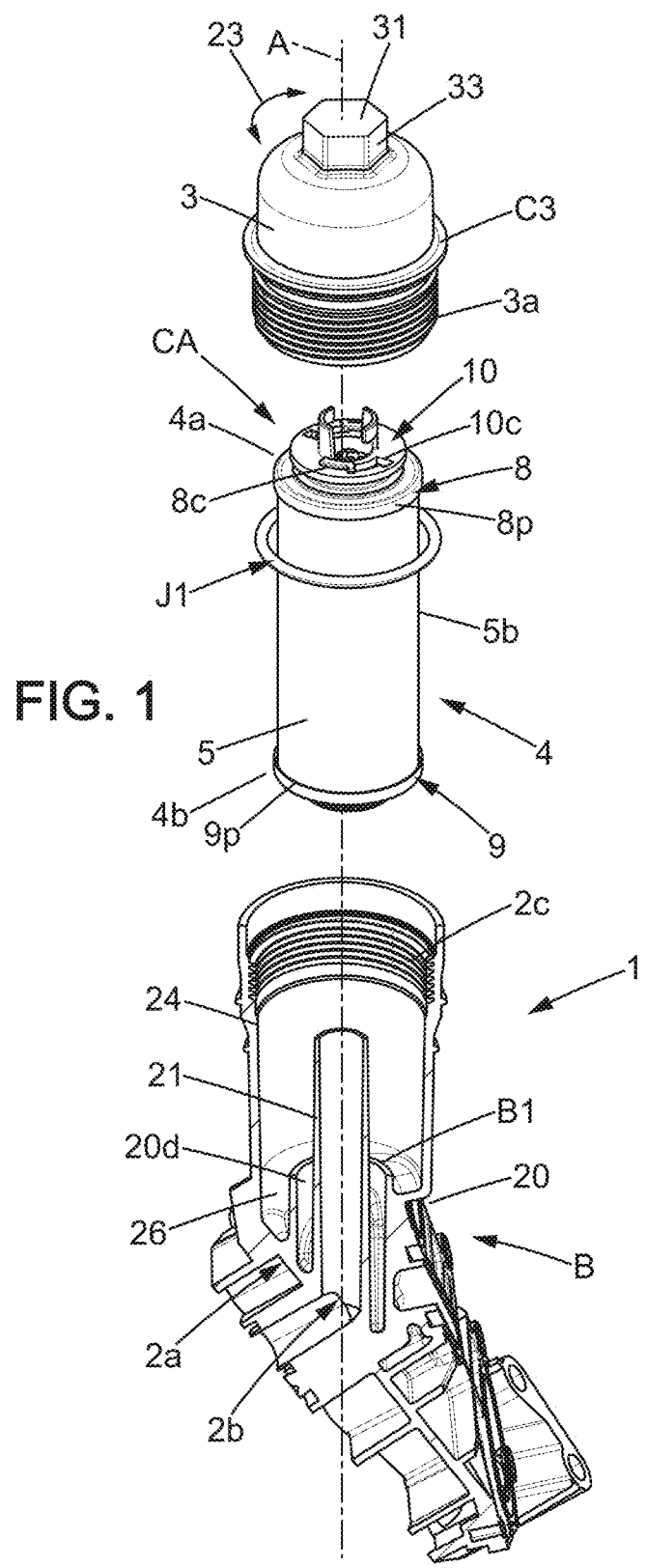
FIG. 1 is an exploded view of a filter according to the invention, illustrating the filter cartridge and the associated housing which has a mounting bracket and a cover.

It is disclosed a filter for purifying lubricating oil for an internal combustion engine, wherein the filter comprises:

a housing having an inlet for unprocessed liquid and an outlet for purified liquid, the housing defining an interior volume and comprising a cover that can be detached from the rest of the housing;

a filter insert, which extends longitudinally between a distal first end of the outlet and a proximal second end of the outlet, the filter insert being removably received within the interior volume by engaging in a bottom portion of the housing and comprising:

a filter medium of annular shape which extends around a central axis defining a longitudinal axis of the filter insert;

a flange, located towards the first end, for covering one axial end of the filter medium;

a bypass valve forming a preassembled unit and secured to the filter insert, the bypass valve being interposed, within the interior volume towards the first end, between a region upstream of the filtration that is in communication with the inlet and a region downstream of the filtration that is in communication with the outlet; the bypass valve being integrally secured to the cover by a connection system.

The bypass valve of the filter is detachable from the cover so that the assembly formed by the filter insert and the bypass valve defines a removable cartridge, the bypass valve being a preassembled unit provided with at least one removable connection member which:

in a locking configuration, is axially engaged with complementary securing means formed on the first end of the filter insert, and allows subsequent disassembly of the bypass valve from the filter insert (the bypass valve thus being detachable from the filter insert), as the securing with locking the bypass valve to the first end is carried out by pivoting the bypass valve and the filter insert relative to one another about the central axis.

Thus, the filter provides an integration of the bypass valve which allows using the same model of valve with filter inserts of varying structure, it being sufficient that their first end, close to the cover, has for example a central adapter interface for fitting to the valve.

Typically, the complementary securing means are formed on the flange to which the bypass valve is directly attached.

According to one feature, the at least one removable connection member is formed, in a locking configuration, higher than a sealing region defined by the annular radial contact of a sealing member between the flange of the filter insert and the bypass valve, being axially engaged with the complementary securing means formed on the first end of the filter insert.

According to a preferred embodiment, the central adapter interface for fitting to the valve includes the flange in the form of a single part which acts to attach/mount the bypass valve, the flange extending annularly around a central passage for receiving the bypass valve. Preferably, the flange serves for mounting the bypass valve, on the one hand by defining the complementary fastening means, and on the other hand by providing or supporting an annular sealing member which protrudes radially inward relative to the rest of the flange. This sealing member, typically deformable, thus defines a cross-sectional area of the central passage which is slightly smaller (in the non-deformed state of the sealing member) than the cross-sectional area defined at the circumference of an insertion portion of the bypass valve.

If appropriate, a support tube attached to the mounting flange may participate in the retaining function of the sealing member.

According to one feature, the complementary securing means are formed on the flange on which the bypass valve is directly attached. Preferably, these complementary securing means have coupling members each provided with at least one radial arm located further away axially from the filter medium than the removable connection member.

According to another feature, the bypass valve has a portion that is insertable through a central passage of the first end of the filter insert. This arrangement allows reducing the additional height occupied by the bypass valve relative to the filter insert.

Preferably, the insertable portion has a circumferential outer surface forming a cylindrical bearing surface, in sealing annular radial contact with a sealing member that is part of the filter insert.

According to one feature, a sealing region (preferably only one) between the flange of the filter insert and the bypass valve is annularly defined by a radial contact located axially lower than the removable connection member. With this arrangement, it is possible to lock and unlock the bypass valve and filter insert to and from each other, without immediately breaking the seal between these two components.

Here, the terms "low" (drainage side) and "high" (cover side) are clear, as the filter is of the type that functions with a gravity drain, the drainage hole or channel for the lubricating oil being of course located opposite from the cover.

According to one feature, the cover has at least one non-deformable member for attaching the cartridge, engaged against the bypass valve so as to allow driving the cartridge in rotation when unscrewing the cover.

In addition, the cartridge has, opposite to the bottom portion, protrusions which engage for example axially with a top of the non-deformable member, such that the action of unscrewing the cover causes traction and disengagement of the cartridge from the bottom portion.

Preferably, the housing has a fixed element for centering the cartridge, formed opposite to the flange and adapted to penetrate into an interior space bordered by an inner face of the filter medium (this allows guiding the rotational movement, by preventing the cartridge from becoming off-center, especially when beginning to unscrew the cover).

According to one feature, the cover has at least one cartridge attachment member allowing relative rotation between the cover and the cartridge during every screwing and unscrewing of the cover. Preferably, the one or more attachment members of this type are elastically deformable and define a system for clipping into a groove of the cartridge, said system being adapted so that the action of unscrewing the cover causes the cartridge to disengage from the bottom portion.

In various embodiments of the filter according to the invention, one or more of the following arrangements may possibly further be employed:

the cover is detachable from the rest of the housing by unscrewing, the pivoting direction for the locking action corresponding to the unscrewing direction of the cover.

the cover has an internal recess or cavity defined by a central engaging member projecting from the top of the cover, the bypass valve having an attachment interface extending into the recess to engage with the cover.

the sealing member is an O-ring extending in an inner groove of the first end, the inner groove being at least partly defined by the flange.

the bypass valve and the first end of the filter insert are immobilized relative to one another by means of a bayonet-type connection in the locking configuration (unlocking the bypass valve relative to the rest of the cartridge is thus particularly simple to obtain, by rotation of an angle of 90° or less).

the bypass valve has an annular collar having a top face from which protrude the means of attachment to the cover, for example in the general form of inverted L-shaped protrusions distributed around a central passage of the flange.

the complementary securing means comprise two coupling members formed on the flange, axially projecting from the side opposite to the filter medium, each of the two coupling members engaging through a slot formed in a collar of the bypass valve (the use of a collar makes the upper end of the valve particularly robust and easy to manipulate, while enabling the function of axially retaining the flange, typically when unscrewing the cover).

the flange comprises a radial portion of annular shape.

the bypass valve comprises:

at least one axial abutment surface facing in an axial direction and defined by the removable connection member, adapted to engage against the flange from below in the locking configuration, a movable valve closure member, a seating region on which the valve closure member engages in a closed state of the bypass valve, the seating region being axially oriented in the direction opposite to the direction in which the axial abutment surface is facing.

the seating region is closer to the longitudinal axis than the removable connection member is.

the axial abutment surface, which allows driving the flange when unscrewing the cover, and the seating region are formed by a single part of plastic material which defines a bypass duct, the bypass duct leading downwardly in an overpressure configuration in which the valve closure member is pushed against a biasing force of a spring placed in the bypass duct (this allows unfiltered liquid from the downstream region to pass directly into the interior space defined in the hollow of the filter medium).

the complementary securing means extend, parallel to the longitudinal axis, on both sides (both above and below) of a contact plane defined by the axial abutment surface.

the flange, preferably made as one plastic part, includes the complementary securing means and constitutes a mounting flange for the bypass valve.

the flange is made in at least two parts; in this case, one of the parts forming the mounting flange may be wider to define the axial overlap function of the filter medium, while another part can be narrower while providing a contact surface with the bypass valve, at least in the locking configuration.

the housing comprises a bowl presenting a mounting bracket provided with a central duct which extends longitudinally in the direction of an upper opening of the bowl.

a bottom portion of the housing is arranged in the bowl, the filter insert comprising, opposite to the mounting flange, a positioning flange cooperating with the mounting bracket to nest and position the cartridge coaxially on a central duct of the mounting bracket.

the housing has a bottom with a drainage channel that is distinct from the inlet and from the outlet, the filter insert comprising a positioning flange from which protrude plugging means for sealing closed an opening of the drainage channel (drainage may result from the simple effect of gravity when the cartridge is disengaged).

the cover, which forms a closure portion of the housing enabling the plugging of the upper opening of the bowl, is adapted to be screwed onto the bowl, preferably having an insertable portion (for insertion into the bowl) provided with an external thread.

the cover has a cartridge attachment member, the attachment member comprising a portion for driving the cartridge in rotation, at least during an unscrewing of the cover to which the cartridge is fixed.

the positioning flange is a single piece of plastic and includes plugging means which extend around the central duct, this central duct defining the outlet or an axial passage in communication with the outlet.

part of the central duct extends into an interior space bordered by an inner face of the filter medium.

DESCRIPTION OF EMBODIMENTS

In the different figures, the same references denote identical or similar elements.

Referring to FIG. 1, the liquid filter 1 has a housing 2 which comprises a bowl B with a bottom portion 20 and a cover 3 that is detachably fixed to the bowl B, for example by screwing. The general bowl shape B allows defining, with the cover 3, an interior volume V of the housing 2. The bottom portion 20 may include a mounting bracket designed to remain secured to the engine, in a motor vehicle. More generally, it is preferred that the bottom portion 20 or the bowl B as a whole constitutes a fixed portion of the housing 2, while the cover 3 is detachable by means of detachable fastening defined at the periphery of the interior volume V. The cover 3 is preferably made of plastic, while the bottom portion 20 may consist wholly or essentially of metal, for example aluminum or an aluminum alloy. The bowl B as a whole may be of metal.

The cover 3 has for example a threaded area 3a formed on the outer face of a tubular portion of the cover 3. This threaded area 3a typically engages with a complementary threaded area 2c provided on a side wall 24 of the bowl B, here on an inner face of the side wall 24. A sealing ring J1 may be added and placed in axial abutment against a collar C3, here formed on the cover 3 in the non-limiting example of FIG. 1. The upper portion of the cover 3 may have one or more projecting members. Here, a manipulation projection 31 is provided to facilitate grasping with a disassembly tool.

As shown in FIG. 1, to facilitate the screwing or unscrewing of the cover 3 by rotation in either of the directions of the double arrow 23 about the longitudinal axis of the filter insert 4, the outer face of the cover 3 preferably has a manipulation projection 31 which is formed as one piece with the cover 3. The manipulation projection 31 may consist of a boss projecting outward substantially in parallel to the central axis A.

Figure 4:
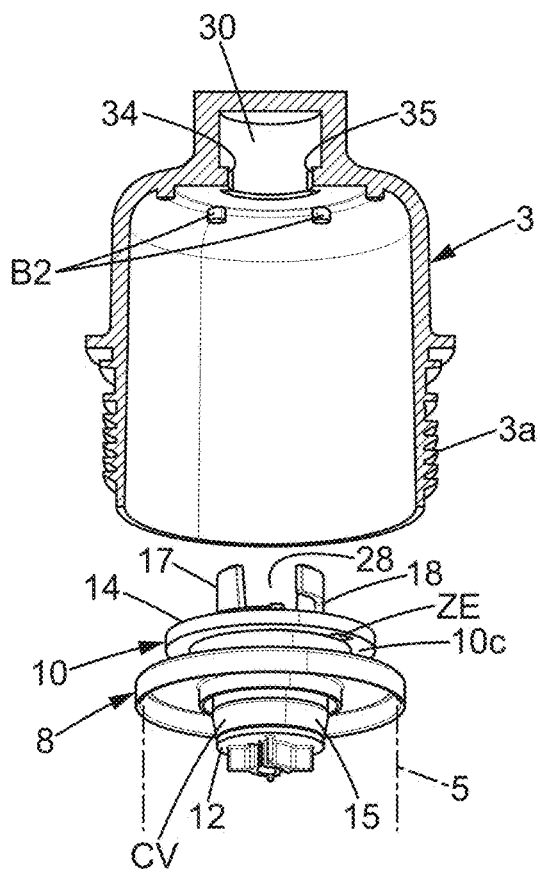
FIG. 4 is an exploded view to show the underside of the upper flange shown in FIG. 2, after disassembly of the cartridge from the housing cover.

Referring to FIGS. 1 and 4, this boss can form a sub-volume 30 of the interior volume V and has an outer surface 33 or active surface, here of hexagonal shape. This outer surface 33 is adapted to fit inside the hollow head of a wrench (not shown) such as a socket wrench or similar tool.

The filter 1 comprises a disposable filter insert 4, capable of filtering a liquid lubricant (oil for an internal combustion engine for example). As shown in FIG. 1, the filter insert 4 has a first end 4a, here at the top, provided with a first flange or mounting flange 8 for mounting a bypass valve 10, and a second end 4b, here at the bottom, provided with a second flange hereinafter called the positioning flange 9. A filter medium 5 of annular shape extends between the two flanges 8, 9 around the central axis A and filters the liquid, typically lubricating oil. Each of the flanges 8, 9 may be made of plastic.

The filter insert 4 supports a bypass valve 10 and enables, with such a bypass valve 10, defining a region Z1 upstream of the filtration, in communication with the inlet 2a for unprocessed liquid, and a region Z2 downstream of the filtration, in communication with the outlet 2b for filtered liquid. In FIG. 1 one can see that the inlet 2a and the outlet 2b are preferably formed opposite from the cover 3, in the bottom portion 20.

Referring to FIG. 1, the assembly formed by the filter insert 4 and the bypass valve 10 defines a removable cartridge CA, adapted to be mounted in and removed from the interior volume V of the housing 2. The bypass valve 10 and the filter insert 4 define a removable cartridge CA. The bypass valve 10 forms a preassembled unit. Attachment of this valve to the first end 4a of the filter insert 4 forms a top portion of the removable cartridge CA.

Towards the second end 4b, the positioning flange 9 forms all or part of the underside of the removable cartridge CA. In this positioning flange 9, as is clearly visible in FIG. 3, there is preferably provided a plugging member 19, projecting axially downward (from the side opposite the mounting flange 8) relative to a radial portion 9a of the positioning flange 9 which covers a lower axial end of the filter medium 5.

It is understood that the positioning flange 9 allows the removable cartridge CA to be engaged in a centered manner in the bottom portion 20. A drainage channel 20d for the liquid lubricant, formed in the bottom portion 20 of the bowl B, can thus be sealed closed by the plugging member 19.

The drainage channel 20d formed in the bottom portion 20 is for example separate from the inlet 2a and outlet 2b. It may extend annularly about and along a lower end of a central duct 21 provided to allow the filtered liquid to drain to the outlet 2b of the filter 1. A duct portion 22 surrounds the central duct 21 with a preferably constant space to define the drainage channel 20d. The duct portion 22 and the side wall 24 of the bowl B define a groove 26 between them which the inlet 2a leads into.

This configuration is not limiting and, for example, the drainage channel 20d may alternatively be designed to be non-concentric with respect to the axis of extension of the central duct 21.

Figure 3:
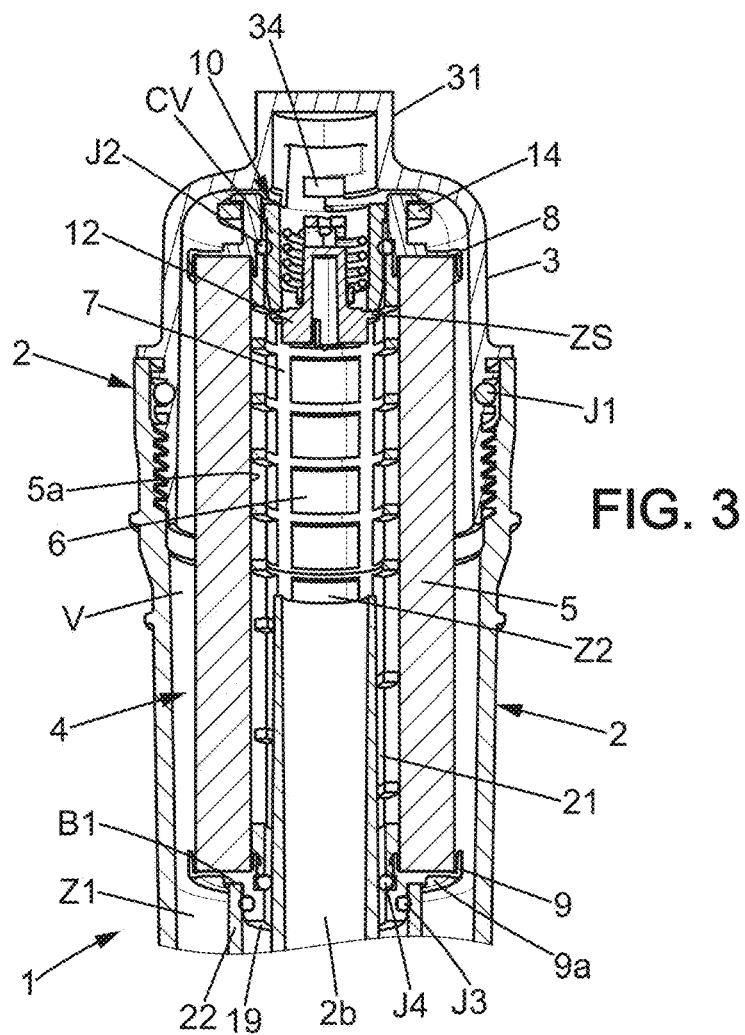
FIG. 3 is a longitudinal sectional view showing the mounting of the cartridge in the bottom portion of the housing, and an example of the engagement between the cartridge and the housing cover, according to the same embodiment as in FIG. 1.

In the non-limiting example illustrated in FIG. 3, the plugging member 19 consists of an axial tubular portion connected to the annular radial portion 9a of the flange 9. The plugging member 19 is provided with at least one sealing ring J3 which defines a circumferential sealing area projecting radially from an inner face of the duct portion 22. Preferably, the plugging member 19 further defines or supports a sealing member, here a sealing ring J4, in order to define a circumferential area in radial contact with the central duct 21. The sealing ring J4 here forms an additional part such that the rest of the positioning flange 9 is radially distanced from the central duct 21.

As is clearly visible in FIG. 1, the filter insert 4 has a longitudinal axis which may correspond to the central axis A around which the filter medium 5 extends. Typically, a radial portion 8a of the mounting flange 8 covers all or part of an axial end 50 of the filter medium 5. This radial portion 8a thus has a first face of a first side on which is arranged the filter medium 5, and a second face of a second side which is opposite the first side along the direction of the axis A. Here, the mounting flange 8 has securing means 8c which are formed as projecting axially from the second face of the mounting flange 8, to enable a releasable connection with a connection member 10c of the bypass valve 10.

The longitudinal axis is also coincident with the central duct 21, preferably cylindrical, which is formed in the bottom portion 20 and extends toward the cover 3. Respective peripheral annular portions 8p, 9p of the flanges 8, 9, which axially extend the radial portions 8a, 9a, are optionally provided in order to cover the ends of the outer side face 5b of the filter medium 5.

During operation of the filter 1, the liquid to be filtered arrives through the inlet 2a and can circulate along a side wall of the housing 2, before crossing the filter medium 5 centripetally. In the interior space 6, the filtered liquid is discharged via the central duct 21 which forms for example the only access to the outlet 2b when the cartridge CA is in the mounted state.

Referring to FIG. 3, the inner face 5a of the filter medium 5 borders an interior space 6 into which extends a support tube 7 that is part of the filter insert 4. The interior space 6 is in sealed communication with one among the inlet 2a and the outlet 2b (preferably the outlet 2b) by a passage formed through the positioning flange 9 when the latter is engaged with the bottom portion 20.

The support tube 7 is preferably a hollow plastic tube having a grid-like structure and which serves to support the inner face 5a (here defined by the filtering material of the filter medium 5) in order to prevent excessive deformation of the filter medium 5 from the pressure of the liquid centripetally traversing the filtering material. The openings in the support tube 7 allow unrestricted entry of the liquid into this tube 7. The support tube 7 may in particular be screwed or clipped directly onto the positioning flange 9, for example in an attachment area located in the interior space 6, above a radial sealing region between the filter insert 4 and the central duct 21. The support tube 7 may also be screwed, clipped, or integrally secured to the mounting flange 8 in some other manner.

In a preferred embodiment of the cartridge CA, the bypass valve 10 is integral in rotation with the cover 3 at least during the operation of unscrewing the cover 3. The integral attachment to the cover 3 can be made directly by projecting protrusions 17, 18 formed on a collar 14 or other portion defining an upper face of the bypass valve 10. The protrusions 17, 18, here two in number, are distributed and spaced apart from one another on the top of the flange 14, without obstructing or interfering with the axial opening of a bypass duct 27 defined by the bypass valve 10.

Figure 5:
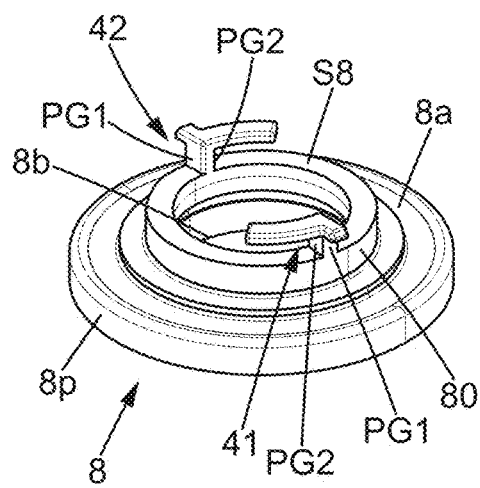
FIG. 5 illustrates an example of a mounting flange provided at the upper end of the filter insert.

Referring to FIGS. 4 and 5, these protrusions 17, 18 may be formed of plastic, as one piece with the outer body CV of the bypass valve 10 which defines the bypass duct 27. Two axial passages 28 are then defined in the gaps formed between the two protrusions 17, 18. Each of these protrusions may have the general shape of an inverted "L".

FIG. 4 illustrates a mounting option in which the protrusions 17, 18 of the bypass valve 10 protrude axially to enter the sub-volume 30 formed in a hollow of a boss of the cover 3. The mounting lugs 34, 35 defined by the cover 3, which protrude radially inward (here in the exit area of the sub-volume 30) can pass through the passages 28 and then be positioned under the widened upper portions of the protrusions 17, 18. These mounting lugs 34, 35 thus engage in the bayonet-type connection interface formed by the protrusions 17, 18. Here, the lugs 34, 35 form non-deformable members (because sufficiently rigid) for attaching the cartridge CA, engaged against the bypass valve 10.

The elbow shape of each of the protrusions 17, 18 defines a lower edge in the portion which projects to the side. Referring to FIG. 3, for the mounted position of the cartridge CA, it is understood that the lower edge formed in the protrusion 17 or 18 is engaged with the upper face of the corresponding lug 34 or 35.

Groove portions are defined in the sub-volume 30, just above these lugs 34, 35. The engagement by relative pivoting between the protrusions 17, 18 and the lugs 34, 35 enables the portions which protrude to the side to engage in these groove portions. With this axial abutment, the rising of the lugs 34, 35 when unscrewing the cover 3 causes an upward axial thrust which carries along the protrusions 17, 18 of the bypass valve 10.

Because the bypass valve 10 is engaged in the filter insert 4, the cartridge CA forms a unit. In fact, the bypass valve 10 is for example made integral with the filter insert 4 through an opening 8b, here a single central opening, of the mounting flange 8. Therefore, the protrusions 17, 18 in the state of engagement with the cover 3 have a function of pulling the entire cartridge CA when the cover 3 is being unscrewed, such that the raising of the cover 3 is converted into a disengagement then a withdrawal of the positioning flange 9 away from the bottom portion 20. It is therefore possible to extract the cartridge CA from the bowl B, with the cover 3.

It is permissible here to bring the collar 14 closer to the bottom of the cover 3 to increase compactness, because the protrusions 17, 18 are received in the sub-volume 30. The structure of the protrusions 17, 18 allows obtaining a compact and detachable method of attachment, whereby the bypass valve 10 can be integral in rotation with the cover 3 (at least during a movement of unscrewing the cover 3) while allowing the bypass valve 10 to be easily disassembled from the cover 3 by a pivoting which generally does not exceed 90°.

On the same side as the mounting flange 8, the bypass valve 10 may be mounted in a manner that seals the opening 8b. To achieve this, here the bypass valve 10 has an insertable portion 15 that is engaged axially through a central passage of the flange 8, defined by the opening 8b. This insertable portion 15 has a circumferential outer surface forming a cylindrical bearing surface 16 (clearly visible in FIG. 6). This cylindrical bearing surface 16 is in fluidtight annular radial contact with a sealing member J2, here an O-ring, which is part of the filter insert 4.

Such a sealing member J2 can be retained by being mounted in an internal circumferential recess or an inner groove G of the first end 4a of the filter insert 4. This inner groove G is defined for example at least in part by the flange 8, in the interior space 6 or at a level close to that of the upper axial end 50 of the filter medium 5. In an alternative embodiment, the sealing member J2 may be defined integrally with a molded plastic part which forms all or part of the mounting flange 8, for example by being formed by an inwardly protruding bead or a sealing lip.

Figure 6:
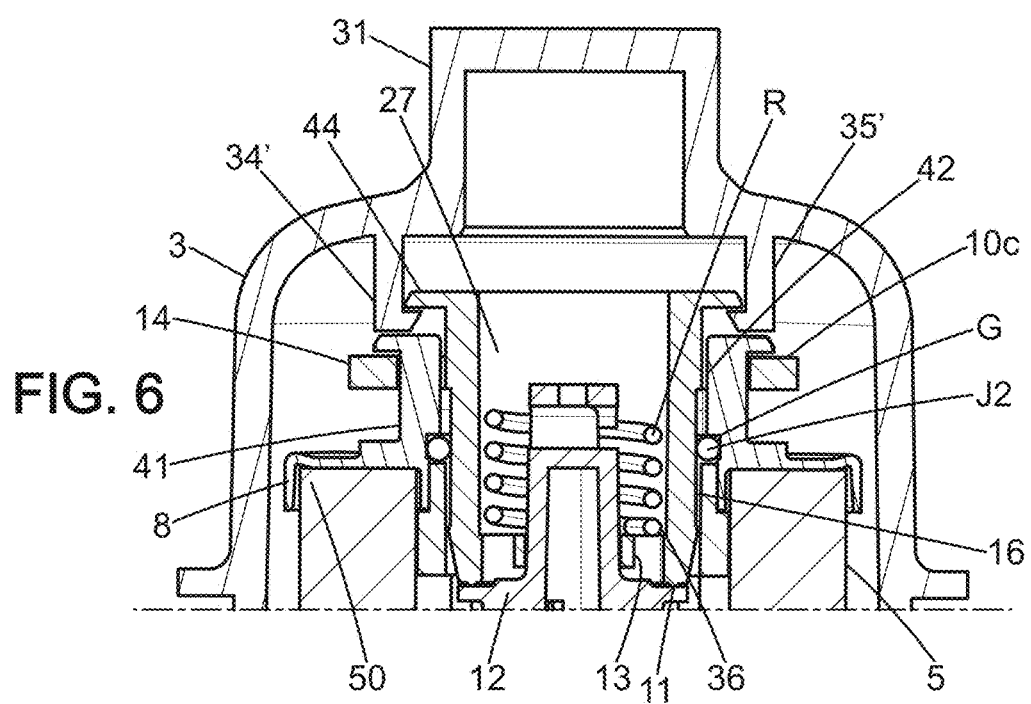
FIG. 6 is a longitudinal sectional view illustrating an alternative embodiment for securing the cartridge to the cover.

Referring to FIGS. 3 and 6, one can see that the bypass valve 10 has a seat region ZS which extends into the interior space 6. The bypass valve 10 has a valve closure member 12 that is axially movable and adapted to allow communication between the upstream region Z1 and the downstream region Z2 when the pressure drop through the filter medium 5 exceeds a threshold.

Although the drawings show the case of a preassembled bypass valve 10 attached to the flange 8 of the filter insert 4 while resting on an axial surface S8 (FIG. 5) thereof, other securing methods are possible, for example by engaging at least a portion of the bypass valve 10 with the support tube 7.

An embodiment of the bypass valve 10 will now be described in more detail with reference to FIGS. 2 and 3.

The bypass valve 10 has an outer body CV, here formed of a single part of plastic or other rigid material, which includes:
  a tubular member 11 extending longitudinally around a central axis which typically can be coincident with the longitudinal axis A when in a state where the bypass valve 10 is mounted on the first end 4a of the filter insert 4, the tubular member 11 forming an insertion portion extending into the interior space 6, towards a lower end;

a stop member 13 adapted for engagement with axial support of the fixed end 36 (for example a lower end) of a spring R of the bypass valve 10, a collar 14 connected to an upper end of the tubular member 11.

The bypass valve 10 also includes the spring R, here helical in shape at least in an intermediate portion, and the valve closure member 12 whose lower end is preferably enlarged to enable closing off the bottom of the bypass duct 27 formed by the tubular member 11. The seat region ZS for axially receiving the valve closure member 12 is for example defined by the lower free edge of the tubular member 11.

The stop member 13 extends through an axial passage formed internally in the tubular member 11 and may include a plurality of spacers distanced from each other. The spring R has a movable end secured to an attachment portion of the closure member 12, provided on the same side as an upper end of the closure member 12.

The closed configuration is the default configuration, and higher pressure is required on the same side as the upstream region Z1 so that the valve closure member 12 is pushed downward toward the bottom portion 20.

Figure 2:
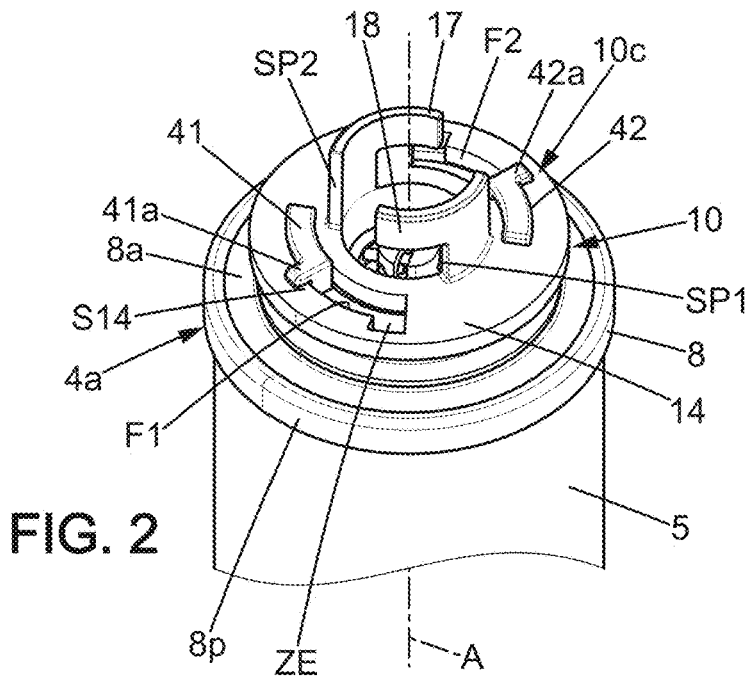
FIG. 2 is a perspective view showing a first end of the cartridge of FIG. 1, from the side of the upper flange of the filter insert.

Referring to FIG. 2, one can see that the outer body CV may optionally define an attachment interface used both for attachment to the cover 3 and for receiving and locking in position one or more coupling members 41, 42 of the filter insert 4.

In addition to the protrusions 17, 18, here provided near the edge of an upper opening defined by the tubular element 11, the bypass valve 10 may have at least one connection member 10c in its upper end that defines for example slots F1, F2 or notches suitable for:

allowing the passage of at least two coupling members 41, 42 which protrude axially from an annular projection 80 formed in the mounting flange 8, and allowing a pivoting of the mounting flange 8 after such passage, while the connection member 10c formed at the upper end of the bypass valve 10 rests axially on the projection 80.

In particular, here the bypass valve 10 is made integral with the mounting flange 8 by means of a bayonet-type connection or similar detachable connection in which the relative rotational movement between the flange 8 and the connection member 10c make it possible to lock an attachment configuration.

The collar 14, of annular shape, in this non-limiting example allows forming at least two curved slots F1, F2 each defining a portion of a circular path. In addition, each of the slots F1, F2 may have a substantially constant width, except in a widened region ZE which may be located on the same side as an insertion end of the slot concerned F1 or F2. Opposite to the insertion end, there is no widening and the slot F1, F2 has an engagement edge adapted to engage in a groove portion PG2 of the coupling members 41, 42.

Referring to FIGS. 2 and 5, the presence of a widened region ZE in each of the slots F1, F2 allows defining two widening directions (not parallel to each other) in the coupling members 41, 42 which here are bayonet connection members. In this manner, there exist two groove portions PG1 and PG2 defined by each coupling member 41, 42, with a different orientation (for example a 90° orientation between each other as is clearly visible in FIG. 5).

Here, the coupling members 41, 42 are projecting axially upward from the projection 80 which is preferably annular and continuous. One can see in FIG. 5 that the anchoring/coupling members are connected to the projection 80 by a narrow portion (not wider than the width of the slots F1, F2) to which two radial arms are connected. One of these two arms extends in a first direction of circumferential widening, for example parallel to the annular projection 80 while optionally being elongated. This thus defines an elbow shape, defining the groove portion PG2 under the elongated arm. The other 41a, 42a of these two arms can project radially outward relative to the narrow portion, and the groove portion PG1 is defined under this arm (which here is shorter than the elongated arm, this example not being limiting).

The removable connection member 10c comprises an axial abutment surface S14 which can engage against the flange 8, here by the underside of each of the arms of the coupling members 41, 42.

In one option, at least one cam surface may be provided on one among the flange 8 and the connection member 10c, in the one or more engagement regions. For example, a cam effect is obtained in order to complete the locking, by increasing the axial clamping between the flange 8 and the connection member 10c of the bypass valve 10. A cam surface can thus be provided on the lower face of the elongate arms, with a maximum thickness in the area adjacent to the groove portion PG2.

Additionally or alternatively, there may be provided a locking finalization system with a clip-on effect and/or any engagement of a retaining protrusion by elastic deformation of the coupling members 41, 42. More generally, it is understood that it is preferable to make it more difficult to unlock the attachment between the flange 8 and the connection member 10c, here obtained by a first bayonet connection system (8c, 10c), than to unlock the protrusions 17, 18 used in the second bayonet connection system. The retaining effect caused by the sealing contact (typically with the presence of the seal J2) and the interaction between the parts contribute to making the first system (8c, 10c) more difficult to unlock.

Although the securing means 8c provided on the flange 8 are described herein as two coupling members 41, 42 insertable through slots F1, F2, it is understood that other mounting options are possible, for example by forming lateral grooves or slots on the flange 8 and introducing into these slots projecting portions formed in the upper end of the bypass valve 10.

In an alternative embodiment of the cartridge CA, the mounting flange 8 can be directly attached to the cover 3 and integral with the latter in rotation at least during the unscrewing operation. The integrally securing to the cover 3 may be achieved by projecting protrusions formed by the mounting flange 8, such protrusions able to pass through a removable connection member 10c or interface provided on the bypass valve 10.

Referring to FIG. 6, one can see that the cartridge CA may optionally be attached to the cover 3 without necessarily rotating therewith during screwing and unscrewing operations.

Here, the cartridge CA is roughly identical to the one shown in FIGS. 1 to 3, aside from the method for attaching the cover 3 permitted by the bypass valve 10. The cover 3 has at least one attachment member 34', 35' which is elastically deformable, in order to be able to engage in a groove, for example under an additional collar 44 formed above collar 14. Such an additional collar 44 may optionally be created by a part attached to or molded onto the outer body CV of the bypass valve 10. At least two or at least three attachment tabs with a clip-on effect may be provided, integrally molded with the remainder of the cover 3, to define the attachment members 34', 35'.

Of course, the retaining region of the attachment members 34', 35' can be adapted to requirements. For example, one can define a retaining groove or groove portions in the upper end 4a of the filter insert 4, particularly when this upper end 4a extends axially higher than the first bayonet connection system (8, 10c).

This option of FIG. 6 also allows disengaging the cartridge CA from the bottom portion 20 then disconnecting the cartridge CA from the cover 3. Here, unlike the solution with a second bayonet connection system, the action of unscrewing the cover 3 does not rotate the cartridge CA since the attachment members 34', 35' can rotate freely against the retaining groove or groove portions.

An example of a disassembly operation will now be described with reference to FIGS. 1 to 4, where two bayonet connection systems are provided.

As shown in FIG. 3, when the cartridge CA is in position inserted within the interior volume V, the drainage channel 20d for emptying the liquid is plugged by the plugging member 19 and the positioning flange 9 is engaged axially on the abutment B1 defined here by the free edge of the duct portion 22. Although the abutment B1 is illustrated in FIG. 1 as forming a continuous flat surface, alternatively an abutment B1 may be provided that is formed by discontinuous surfaces.

Pins or other projections protruding axially inward, formed in the cover 3, may provide a centering function, and optionally define abutments B2 opposite to abutment B1, in order to maintain the inserted position of the cartridge CA. The pins may be arranged to guide and/or come to rest against the upper end of the bypass valve 10, here on an upper face of the collar 14 and in a peripheral area which is preferably offset radially outward relative to the slots F1, F2. Of course, in an alternative embodiment, a continuous surface of the cover 3 can also define a single indexing member or a single abutment B2.

When unscrewing the cover 3 to which the cartridge CA is fixed, the coupling tabs 34, 35 exert a driving action by pressing against thrust surfaces SP1. Such thrust surfaces SP1 are defined by the protrusions 17, 18 that are part of the bypass valve 10. Here, one can see that the pivot direction for the locking action corresponds to the unscrewing direction of the cover 3.

Referring to FIGS. 1 and 2, one can see that the bypass valve 10 constitutes an intermediate component in the rotational driving of the filter insert 4 by the cover 3. When unscrewing, the thrust surfaces SP1 are stressed and the collar 14 in turn drives the rotation of the coupling members 41, 42. When unscrewing, it is understood that each of the two bayonet connection systems is in a locked state preventing axial separation.

As the cover 3 rises along the thread 2c, the positioning flange 9 rises then disengages from the drainage channel 20d. In effect, the height of the thread region between the cover 3 and the bowl B is typically larger than the axial extension of the plugging member 19.

As the opening of the drainage channel 20d requires significant lifting force, the axial retention between the components 4, 10 of the cartridge CA must be robust, and the retention of the cover 3 must be as well. During screwing, however, it is not necessary to have such a level of robustness in the retention. This is why the screwing can be carried out in a satisfactory manner, even with the protrusions 17, 18 driven by the one or more thrust surfaces SP2, in a configuration which does not provide as much axial retention between pairs of components, in particular between the cover 3 and the bypass valve 10. This does not pose a problem because the conditions for screwing a cover 3 onto a bowl B which is fixed relative to the motor are not able to generate axial distance between the components.

It should be obvious to those skilled in the art that the present invention allows embodiments in many other specific forms without departing from the scope of the invention as claimed.

The invention claimed is:

1. A filter for purifying lubricating oil for an internal combustion engine, comprising:
  a housing having an inlet for unprocessed liquid and an outlet for purified liquid, the housing defining an interior volume and comprising a cover that is detachable from a remainder of the housing;
  a filter insert having a first end and a second end, the filter insert extending longitudinally between the first end, which is distal relative to the outlet, and the second end, which is proximal relative to the outlet, the filter insert being removably received within the interior volume by engaging in a bottom portion of the housing and comprising:
    a filter medium of annular shape which extends around a central axis defining a longitudinal axis of the filter insert, and
    a flange, located towards the first end, for covering one axial end of the filter medium; and
  a bypass valve forming a preassembled unit and secured to the filter insert, the bypass valve being interposed, within the interior volume towards the first end of the filter insert, between a region upstream of the filter medium that is in communication with the inlet and a region downstream of the filter medium that is in communication with the outlet, the bypass valve being integrally secured to the cover,
  wherein the bypass valve:
    is detachable from the cover so that an assembly formed by the filter insert and the bypass valve defines a removable cartridge,
    forms a preassembled unit, and has a removable connection member which:
      in a locking configuration, is axially engaged with complementary securing elements formed on the first end of the filter insert, the complementary securing elements being formed on the flange to which the bypass valve is directly attached, and
      allows subsequent disassembly of the bypass valve from the filter insert;
  wherein the bypass valve is configured to be integrally secured on the first end of the filter insert by a first bayonet connection system that reversibly locks the bypass valve to the first end of the filter insert by way of a locking action which is carried out by pivoting the bypass valve and the filter insert relative to one another about the central axis, only one pivoting direction allowing the locking action performed by the first bayonet connection system;
  wherein the bypass valve and the first end of the filter insert are immobilized relative to one another by the first bayonet connection system in the locking configuration;
  wherein the complementary securing elements comprise two coupling members formed on the flange, projecting from a side of the flange opposite to the filter medium;
  wherein the cover is engaged with an axially protruding part of the bypass valve, which:

protrudes axially toward the cover, beyond the two coupling members, and comparatively with the two coupling members, is arranged closer to the central axis;

wherein a second bayonet connection system directly connects a piece of the bypass valve, including the removable connection member, to rigid mounting lugs of the cover, so that said piece of the bypass valve is distributed in the first bayonet connection system and in the second bayonet connection system; and wherein, below the rigid mounting lugs, the cover rests against an upper end of the bypass valve.

2. The filter according to claim 1, wherein the cover is detachable from a remainder of the housing by unscrewing, said pivoting direction for the locking action selectively corresponding to an unscrewing direction of the cover, wherein the rigid mounting lugs are engaged against the axially protruding part of the bypass valve so as to allow driving the cartridge in rotation when unscrewing the cover, the cartridge having, opposite to the bottom portion, protrusions which each engage axially with a top of the rigid mounting lugs, such that the action of unscrewing the cover causes the cartridge to disengage from the bottom portion;

wherein each of the protrusions has:

a protrusion thrust surface, extending parallel to the central axis, and an elbow shape with a protrusion portion that projects perpendicular to the protrusion thrust surface, above the protrusion thrust surface and tangentially from a top of the protrusion thrust surface; and wherein the protrusions are configured to be simultaneously driven rotatably, when the cover is unscrewed, by a pushing action of the rigid mounting lugs, the rigid mounting lugs being selectively engaged against the protrusion thrust surfaces and below the protrusion portions.

3. The filter according to claim 1, wherein the bypass valve has a portion, including a tubular member, that is insertable through a central passage of the flange, the insertable portion having a circumferential outer surface of the tubular member forming a cylindrical bearing surface, in sealing annular radial contact with a sealing member that is part of the filter insert.

4. The filter according to claim 3, wherein the removable connection member is formed, in a locking configuration, higher than a sealing area formed by the annular radial contact of the sealing member between the flange of the filter insert and the bypass valve, and wherein the circumferential outer surface of the tubular member is axially adjacent to a lower annular end of the tubular member, which defines a seat region for a valve closure member of the bypass valve.

5. The filter according to claim 1, wherein the removable connection member comprises two slots formed in a collar of the bypass valve, and wherein each of the two coupling members engages through a slot chosen amongst the two slots formed in the collar of the bypass valve.

6. The filter according to claim 5, wherein the flange comprises a radial portion of annular shape, wherein the bypass valve comprises:

at least one axial abutment surface defined by the removable connection member and adapted to engage against an underside of the two coupling members in said locking configuration, a movable valve closure member, and a seating region on which the valve closure member engages in a closed state of the bypass valve, the seating region being axially oriented opposite to said axial abutment surface, and wherein each of the two coupling members is provided with at least one radial arm located further away axially from the filter medium than the removable connection member.

7. The filter according to claim 5, wherein the collar extends around a bypass duct that belongs to the bypass valve, the collar including an upper face of the bypass valve, and wherein the two slots are curved and define each a portion of a circular path, positioned to be radially shifted inward relative to a peripheral area of the collar and radially shifted outward relative to an axial opening of the bypass duct, each of the two slots having, at respective ends thereof, a widened region, and wherein the two coupling members are each provided with a radial arm.

8. The filter according to claim 5, wherein the cover comprises pins protruding axially inward, below the mounting lugs, to rest against the collar of the bypass valve.

9. The filter according to claim 1, wherein the flange includes the complementary securing elements and constitutes a mounting flange for the bypass valve, and wherein the housing comprises:

a bowl in which is arranged the bottom portion of the housing, and comprising a mounting bracket, the filter insert comprising, opposite to the mounting flange, a positioning flange cooperating with said mounting bracket to nest and position the cartridge coaxially on a central duct of the mounting bracket; and said cover which is adapted to be screwed onto the bowl, the rigid mounting lugs comprising a portion for driving the cartridge in rotation, at least during an unscrewing of the cover to which the cartridge is fixed.

10. The filter according to claim 9, wherein the positioning flange is a single piece of plastic and includes a plugging member which extends around the central duct that defines the outlet or is in communication with the outlet.

11. The filter according to claim 1, wherein an outer face of the cover has a manipulation projection, formed as one piece with the cover, which consists of a boss projecting outward, parallel to the central axis, and wherein the axially protruding part of the bypass valve protrudes axially to enter in a hollow of the boss.

12. The filter according to claim 11, wherein the removable connection member belongs to a single piece that is present in both the first bayonet connection system and the second bayonet connection system, and wherein the single piece, provided with a collar engaged by the two coupling members, comprises:

a lower part that protrudes downwardly inside an interior space of the filter medium, and two protrusions that protrude upwardly inside the hollow of the boss, the two protrusions being engaged each axially with a top of the rigid mounting lugs that protrude radially inward, below the hollow of the boss.

13. The filter according to claim 12, wherein the cover comprises pins protruding axially inward, below the mounting lugs, to rest against the collar.

14. A filter for purifying lubricating oil for an internal combustion engine, comprising:
- a housing having an inlet for unprocessed liquid and an outlet for purified liquid, the housing defining an interior volume and comprising a cover that is detachable from a remainder of the housing;
- a filter insert having a first end and a second end, the filter insert extending longitudinally between the first end, which is distal relative to the outlet, and the second end, which is proximal relative to the outlet, the filter insert being removably received within the interior volume by engaging in a bottom portion of the housing and comprising:
  - a filter medium of annular shape which extends around a central axis defining a longitudinal axis of the filter insert, and
  - a flange, located towards the first end, for covering one axial end of the filter medium; and
- a bypass valve forming a preassembled unit and secured to the filter insert, the bypass valve being interposed, within the interior volume towards the first end of the filter insert, between a region upstream of the filter medium that is in communication with the inlet and a region downstream of the filter medium that is in communication with the outlet, the bypass valve being integrally secured to the cover,
- wherein the bypass valve:
  - is detachable from the cover so that an assembly formed by the filter insert and the bypass valve defines a removable cartridge,
  - forms a preassembled unit, and has a removable connection member which:
    - in a locking configuration, is axially engaged with complementary securing elements formed on the first end of the filter insert, the complementary securing elements being formed on the flange to which the bypass valve is directly attached, and
    - allows subsequent disassembly of the bypass valve from the filter insert;
- wherein the bypass valve is configured to be integrally secured on the first end of the filter insert by a first bayonet connection system that reversibly locks the bypass valve to the first end of the filter insert by way of a locking action which is carried out by pivoting the bypass valve and the filter insert relative to one another about the central axis, only one pivoting direction allowing the locking action performed by the first bayonet connection system;
- wherein the bypass valve and the first end of the filter insert are immobilized relative to one another by the first bayonet connection system in the locking configuration;
- wherein the complementary securing elements comprise two coupling members formed on the flange, projecting from a side of the flange opposite to the filter medium;
- wherein the cover is engaged with an axially protruding part of the bypass valve, which:
  - protrudes axially toward the cover, beyond the two coupling members, and
  - comparatively with the two coupling members, is arranged closer to the central axis;
- wherein a second bayonet connection system directly connects a piece of the bypass valve, including the removable connection member, to rigid mounting lugs of the cover, so that said piece of the bypass valve is distributed in the first bayonet connection system and in the second bayonet connection system,
- wherein an annular projection is formed in the flange, the annular projection protruding toward a collar of the removable connection member,
- wherein the two coupling members, which are formed on the flange to which the bypass valve is directly attached, axially protrude from the annular projection, and
- wherein the two coupling members each have a branched structure with two radial arms each radially connected to a common narrow portion axially extending from the annular projection, the two radial arms comprising a radial arm, longer than the common narrow portion, that is located further away axially from the filter medium than said removable connection member.

15. The filter according to claim 14,
- wherein the removable connection member comprises two slots formed in a collar of the bypass valve, and
- wherein each of the two coupling members is engaging through a slot chosen amongst the two slots formed in the collar of the bypass valve.

16. A filter for purifying lubricating oil for an internal combustion engine, comprising:
- a housing having an inlet for unprocessed liquid and an outlet for purified liquid, the housing defining an interior volume and comprising a cover that is detachable from a remainder of the housing;
- a filter insert having a first end and a second end, the filter insert extending longitudinally between the first end, which is distal relative to the outlet, and the second end, which is proximal relative to the outlet, the filter insert being removably received within the interior volume by engaging in a bottom portion of the housing and comprising:
  - a filter medium of annular shape which extends around a central axis defining a longitudinal axis of the filter insert, and
  - a flange, located towards the first end, for covering one axial end of the filter medium;

and
- a bypass valve forming a preassembled unit and secured to the filter insert, the bypass valve being interposed, within the interior volume towards the first end of the filter insert, between a region upstream of the filter medium that is in communication with the inlet and a region downstream of the filter medium that is in communication with the outlet, the bypass valve being integrally secured to the cover,
- wherein the bypass valve:
  - is detachable from the cover so that an assembly formed by the filter insert and the bypass valve defines a removable cartridge,
  - forms a preassembled unit, and
  - has a removable connection member which:
    - in a locking configuration, is axially engaged with complementary securing elements formed on the first end of the filter insert, the complementary securing elements being formed on the flange to which the bypass valve is directly attached, and
    - allows subsequent disassembly of the bypass valve from the filter insert;
- wherein the bypass valve is configured to be integrally secured on the first end of the filter insert by a first bayonet connection system that reversibly locks the bypass valve to the first end of the filter insert by way of a locking action which is carried out by pivoting the bypass valve and the filter insert relative to one another about the central axis, only one pivoting direction allowing the locking action performed by the first bayonet connection system;

wherein the bypass valve and the first end of the filter insert are immobilized relative to one another by the first bayonet connection system in the locking configuration;

wherein the complementary securing elements comprise two coupling members formed on the flange, projecting from a side of the flange opposite to the filter medium;

wherein the cover is engaged with an axially protruding part of the bypass valve, which:
 protrudes axially toward the cover, beyond the two coupling members, and
 comparatively with the two coupling members, is arranged closer to the central axis;

wherein a second bayonet connection system directly connects a piece of the bypass valve, including the removable connection member, to rigid mounting lugs of the cover, so that said piece of the bypass valve is distributed in the first bayonet connection system and in the second bayonet connection system; and wherein the two coupling members are each provided with two groove portions, the two groove portions having a different orientation and being upwardly delimited, respectively, by two radial arms with a 90° orientation between each other.

\* \* \* \* \*